US 8,752,132 B2

(12) United States Patent
Smith et al.

(10) Patent No.: US 8,752,132 B2
(45) Date of Patent: *Jun. 10, 2014

(54) METHODS, APPARATUSES, AND SYSTEMS FOR THE DYNAMIC EVALUATION AND DELEGATION OF NETWORK ACCESS CONTROL

(75) Inventors: Ned M. Smith, Beaverton, OR (US); Howard C. Herbert, Phoenix, AZ (US); Karanvir Grewal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 12/901,349

(22) Filed: Oct. 8, 2010

(65) Prior Publication Data

US 2013/0276052 A1 Oct. 17, 2013

Related U.S. Application Data

(63) Continuation of application No. 11/171,593, filed on Jun. 29, 2005, now Pat. No. 7,827,593.

(51) Int. Cl.
*H04L 29/06* (2006.01)

(52) U.S. Cl.
USPC ............. 726/3; 726/1; 726/2; 726/4; 726/11; 709/220; 709/221; 709/225

(58) Field of Classification Search
USPC ............. 726/1, 2, 3, 4, 11; 709/220, 221, 225
See application file for complete search history.

(56) References Cited

U.S. PATENT DOCUMENTS

| | | | |
|---|---|---|---|
| 6,944,150 B1 | 9/2005 | McConnell et al. | |
| 7,624,265 B1 | 11/2009 | Slyva et al. | |
| 7,827,593 B2 * | 11/2010 | Smith et al. | 726/3 |
| 8,434,125 B2 * | 4/2013 | Ramesh et al. | 726/1 |
| 2003/0126464 A1 | 7/2003 | McDaniel et al. | |
| 2004/0088583 A1 * | 5/2004 | Yoon et al. | 713/201 |
| 2004/0103310 A1 | 5/2004 | Sobel et al. | |
| 2004/0193912 A1 | 9/2004 | Li et al. | |
| 2005/0086510 A1 | 4/2005 | Nicodemus et al. | |
| 2005/0257249 A1 | 11/2005 | Shay | |
| 2006/0021001 A1 | 1/2006 | Giles et al. | |
| 2006/0021003 A1 | 1/2006 | Fisher et al. | |
| 2006/0085844 A1 | 4/2006 | Buer et al. | |
| 2006/0168648 A1 * | 7/2006 | Vank et al. | 726/4 |
| 2006/0200856 A1 | 9/2006 | Salowey et al. | |
| 2007/0002834 A1 | 1/2007 | Taylor | |

(Continued)

OTHER PUBLICATIONS

Final Office Action for U.S. Appl. No. 11/171,593, (Jul. 20, 2009), Whole Document.

(Continued)

*Primary Examiner* — Cordelia Zecher
*Assistant Examiner* — Sarah Su
(74) *Attorney, Agent, or Firm* — Blakely, Sokoloff, Taylor & Zafman LLP (57) ABSTRACT

Embodiments of the inventions are generally directed to methods, apparatuses, and systems for the dynamic evaluation and delegation of network access control. In an embodiment, a platform includes a switch to control a network connection and an endpoint enforcement engine coupled with the switch. The endpoint enforcement engine may be capable of dynamically switching among a number of network access control modes responsive to an instruction received from the network connection.

18 Claims, 6 Drawing Sheets

(56) References Cited

U.S. PATENT DOCUMENTS

| | | |
|---|---|---|
| 2007/0157287 A1 | 7/2007 | Lim |
| 2007/0266421 A1 | 11/2007 | Vaidya et al. |
| 2008/0028436 A1 | 1/2008 | Hannel et al. |
| 2008/0040775 A1 | 2/2008 | Hoff et al. |
| 2008/0151917 A1* | 6/2008 | Bartlett et al. ............. 370/401 |
| 2008/0222693 A1 | 9/2008 | McAlister |
| 2009/0006850 A1 | 1/2009 | Birger et al. |
| 2009/0007264 A1 | 1/2009 | Chatterjee et al. |
| 2009/0228951 A1* | 9/2009 | Ramesh et al. ................. 726/1 |
| 2009/0307706 A1* | 12/2009 | Jostmeyer et al. ........... 718/104 |

OTHER PUBLICATIONS

Notice of Allowance of U.S. Appl. No. 11/171,593, (Jun. 22, 2010), Whole Document.

Office Action for U.S. Appl. No. 11/171,593, (Jan. 12, 2009), Whole Document.

Office Action for U.S. Appl. No. 11/171,593, Mailed Dec. 22, 2009, Whole Document.

U.S. Appl. No. 60/647,692, entitled "Enabling Dynamic Authentication with Different Protocols on the Same Port for a Switch", filed Jan. 26, 2005, Whole Document.

Notice of Allowance for Taiwan Patent Application No. 95123320, English Translation, (Nov. 30, 2009), Whole Document.

Office Action for Taiwan Patent Application No. 95123320, (May 11, 2009), Whole Document.

PCT, International Preliminary Report on Patentability (Chapter I of the Patent Cooperation Treaty) for Application No. PCT/US2006/025478, (Jan. 9, 2008), Whole Document.

PCT, International Search Report and Written Opinion for Application No. PCT/US2006/025478, filed Jun. 29, 2006, (Dec. 7, 2006), Whole Document.

Durham, et al., "The COPA (Common Open Policy Service) Protocol; RFC 2748, Jan. 2000", 38 pages.

Intel, ""LaGrande Technology Architectural Overview" Sep. 2003", pp. 1-8.

Smith, "Digital Office Network Access Technology and Standards; Intel Developer Forum,", (2005) 27 pages.

TCG, ""TCG Trusted Network Connect TNC Architecture for Interoperability" Specification Version 1.0, Revision 4, May 3, 2005", pp. ii-39.

* cited by examiner

METHODS, APPARATUSES, AND SYSTEMS FOR THE DYNAMIC EVALUATION AND DELEGATION OF NETWORK ACCESS CONTROL

RELATED APPLICATION

This application is a continuation of U.S. patent application Ser. No. 11/171,593 filed Jun. 29, 2005.

TECHNICAL FIELD

Embodiments of the inventions generally relate to the field of computer networks and, more particularly, to a methods, apparatus, and systems for the dynamic evaluation and delegation of network access control.

BACKGROUND

A computer network (or, simply, a network) is two or more interconnected computing devices that provide voice and/or data processing. The term "network boundary" refers to a logical boundary between a network and the computing devices that are outside of the network. Various network access schemes exist to control access to a network boundary. One scheme for controlling network access involves the use of three network entities: an access requestor, a policy enforcement point, and a policy decision point.

An access requestor is an entity that seeks access to a network (e.g., to a protected network). The access requestor typically includes the software, hardware, and/or firmware necessary to negotiate a connection to the network. Almost any computing device capable of negotiating a connection to a network may be an access requestor including, for example, a personal computer or a server.

A policy enforcement point is an entity that enforces the access decisions of the policy decision point. The policy enforcement point may also engage in an authentication/authorization process with the access requestor and forward the results of the authentication/authorization process to the policy decision point. A policy enforcement point is typically implemented in, for example, a switch, a firewall, and/or a Virtual Private Network (VPN) gateway.

A policy decision point is a network entity that decides whether to grant network access rights to an access requestor based, for example, on an access policy. The policy decision point typically grants network access based on a network access policy. In conventional networks, the policy decision point is typically implemented in a server coupled with the policy enforcement point.

The conventional approach to controlling network access has a number of limitations. One limitation is that conventional networks are limited to statically defining the network access role of a computing device. This static designation of a network access role usually corresponds to a particular class of devices. For example, policy enforcement points are typically limited to being implemented in devices such as access points and switches. In addition, conventional approaches for controlling network access merely provide an implicit definition of the network boundary. The reason for this is that the topology of devices acting as policy enforcement points implicitly define the boundary of the network.

BRIEF DESCRIPTION OF THE DRAWINGS

Embodiments of the inventions are illustrated by way of example, and not by way of limitation, in the figures of the accompanying drawings in which like reference numerals refer to similar elements.

DETAILED DESCRIPTION

Embodiments of the inventions are generally directed to methods, apparatuses, and systems for the dynamic delegation of network access control. In one embodiment, a computing device can selectively operate in two or more network access control modes. Each network access control mode corresponds to a role that the computing device can perform with regards to controlling access to a network. For ease of reference, the term "mode" is frequently used in this document when referring to a network access control mode. In an embodiment, the mode of the computing device can be dynamically assigned by another computing device. As is further discussed below, the dynamic assignment of the network access control mode allows a network boundary to be dynamically extended and/or retracted. In addition, the network boundary can be explicitly defined by dynamically assigning the mode of the computing devices forming the boundary of the network.

Figure 1:
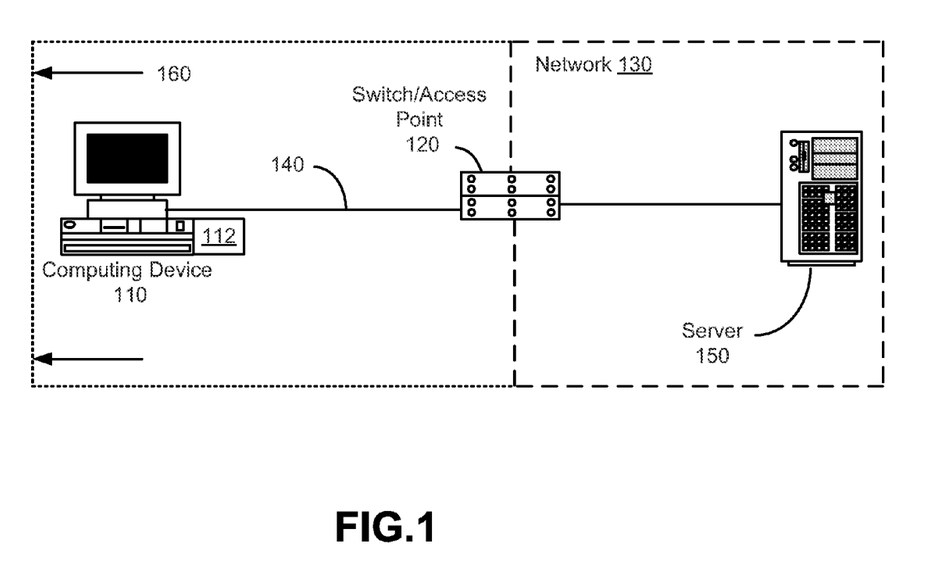
FIG. 1 is a high-level block diagram of a system implemented according to an embodiment of the invention.

FIG. 1 is a high-level block diagram of a system implemented according to an embodiment of the invention. Computing device 110 negotiates with switch/access point 120 to connect with network 130 via link 140. Link 140 may be any combination of wired and wireless links suitable for conveying digital information. Computing device 110 can be any computing device capable of negotiating a network connection including, for example, a desktop computer, a laptop computer, a server, a cellular phone, a digital home network device (e.g., cable/satellite box), and the like.

In an embodiment, computing device 110 includes a platform that has both a host (not shown) and endpoint enforcement engine 112. Endpoint enforcement engine 112 is a platform entity that is capable of dynamically switching between two or more network access control modes. Each network access control mode allows computing device 110 to perform a different network access role. In one embodiment, the network access control modes include an access requestor (AR) mode, a policy enforcement point (PEP) mode, and a policy decision point (PDP) mode. In an alternative embodiment, endpoint enforcement engine 112 provides more network access control modes and/or different network access control modes. In yet another alternative embodiment, endpoint enforcement engine 112 provides two (rather than three or more) network access control modes.

Switch/access point 120 detects that computing device 110 is attempting to connect with network 130. In one embodiment, switch/access point 120 assess the integrity and/or capabilities of computing device 110 based, at least in part, on integrity measurement data. The term "integrity measurement data" broadly refers to empirical data collected from the hardware, software, and/or firmware components of computing device 110. Examples of integrity measurement data include anti-virus parameters, firewall status, software versions, hardware status, log/trace files, and the like. In an embodiment, switch/access point 120 provides the results of the assessment to server 150 (or any other device operating as a PDP).

In an embodiment, server 150 (e.g., acting as a PDP) receives input from switch/access point 120 and decides whether or not to delegate network access control to computing device 110. In an embodiment, delegating network access control to computing device 110 involves dynamically switching the network access control mode (or, simply, mode) of computing device 110. For example, server 150 may instruct computing device 110 to switch from AR mode to PEP mode. If computing device 110 does switch to PEP mode, then the boundary of network 130 is extended to include (at least a part of) computing device 110 as shown by reference number 160. Thus, server 150 can dynamically and explicitly define the boundary of network 130 by specifying the mode of computing devices connected with network 130.

In an embodiment, endpoint enforcement engine 112 can also dynamically retract the boundary of network 130 (e.g., back to the dashed line shown in FIG. 1). Dynamically retracting the boundary of network 130 involves changing the mode of endpoint enforcement engine 112, for example, from PEP mode to AR mode. Dynamically changing the mode of an endpoint enforcement engine is further described below with reference to FIGS. 2-6.

Figure 2:
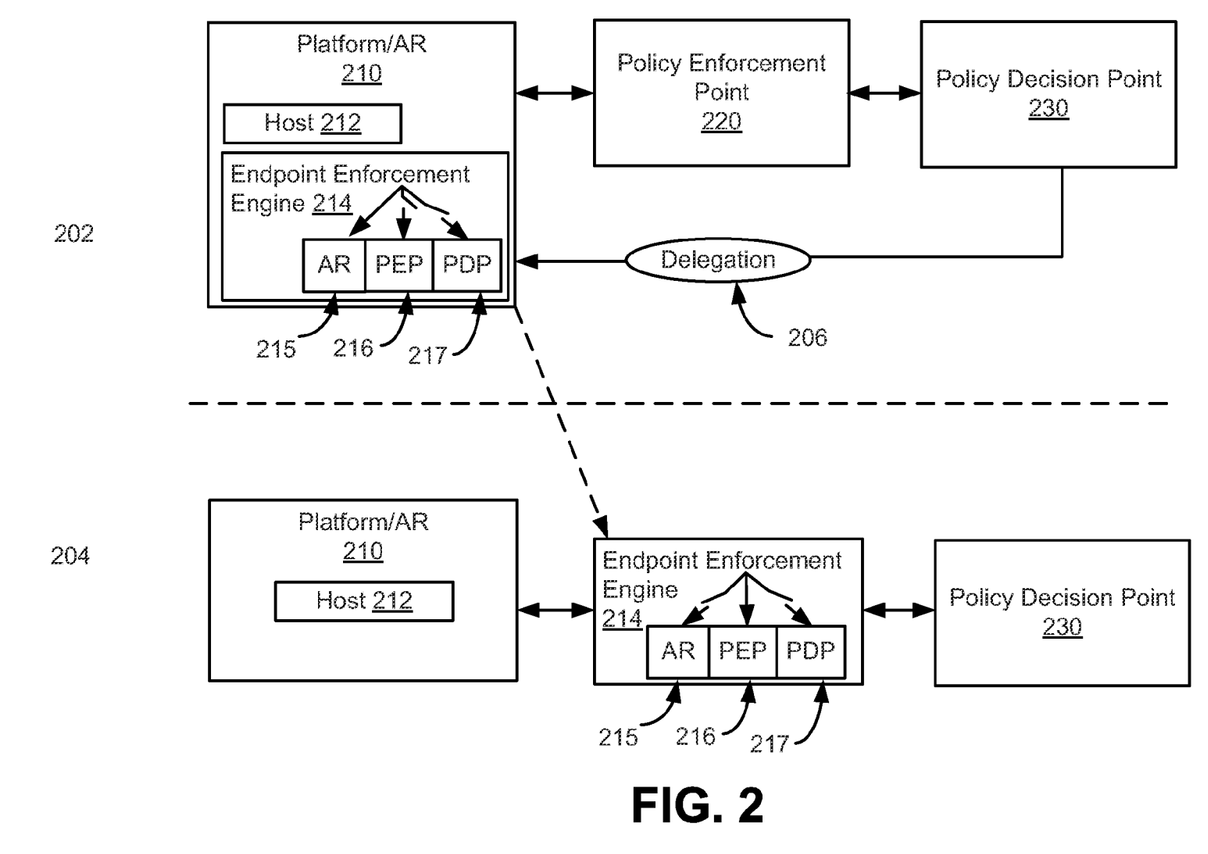
FIG. 2 is a block diagram illustrating the dynamic delegation of a network access control mode according to an embodiment of the invention.

FIG. 2 is a block diagram illustrating the dynamic delegation of a network access control mode according to an embodiment of the invention. While the illustrated embodiment shows a three-mode scheme (e.g., AR, PEP, and PDP) for network access control, it is to be appreciated that in an alternative embodiment a two-mode scheme may be used. In yet another alternative embodiment, a network access control scheme having more than three modes may be used.

Platform 210 includes host 212 and endpoint enforcement engine 214. A platform is the underlying hardware, software, and/or firmware of a computing system. Host 212 represents the elements (e.g., hardware, software, and/or firmware elements) of platform 210 that respond to user requests to process data. Endpoint enforcement engine 214 enables platform 210 (or, at least a part of platform 210) to dynamically switch between network access control modes 215-217. In one embodiment, endpoint enforcement engine 214 is implemented using Intel® Active Management Technology.

As shown by 202, endpoint enforcement engine 214 is initialized in AR mode 215. Endpoint enforcement engine 214 initiates a network connection by communicating the intent to connect to policy enforcement point (PEP) 220. PEP 220 may be a network node (e.g., a switch/access point) that is statically defined to be a PEP. Alternatively, PEP 220 may be a computing device having an endpoint enforcement engine that is switched to PEP mode.

In one embodiment, PEP 220 detects the attempt to connect and establishes a control channel connection with platform 210, while blocking any data channel connectivity. The control channel and/or data channel may be established according to a port based network access control protocol. In one embodiment, the protocol is based, at least in part, on the IEEE 802.1x standard, IEEE std. 802.1x-2001, published on Oct. 25, 2001. The control channel may be linked/routed to policy decision point (PDP) 230 which is capable of making network access control decisions.

In an embodiment, PEP 220 assesses the integrity and/or capabilities of endpoint enforcement engine 214 using, for example, a series of challenge-response exchanges. These challenge-response exchanges may incorporate any form of credentials suitable for establishing the integrity and/or capabilities of endpoint enforcement engine 214. Alternatively, PDP 230 may determine the integrity and/or capabilities of endpoint enforcement engine 214.

As described above, PEP 220 may use a port-based network enforcement scheme (e.g., based, at least in part, on the 802.1x standard). Typically port-based network enforcement schemes are implemented with the expectation that a single entity is present on a port. In such an embodiment, host 212 may be blocked from accessing the network, while endpoint enforcement engine 214 establishes its integrity and capabilities.

As shown by reference number 204, in an embodiment, the pre-assigned (or initial) network access control mode of endpoint enforcement engine 214 can be dynamically changed. For example, PDP 230 may send a command (e.g., delegation command 206) to endpoint enforcement engine 214 directing it to switch from AR mode 215 to, for example, either PEP mode 216, and/or PDP 217. Furthermore, the PDP may send additional data (e.g., Access Control List (ACL) rules) to the endpoint, with explicit instructions on how to enforce the PEP capabilities. For example, the PDP may send additional data to specify ACL rules, outbreak containment rules, intrusion detection and/or monitoring rules, and the like. This additional information may enhance the ability of the PDP to delegate network access control to an AR. Also, the additional information may facilitate the aggregation and distribution of network access control policy among nodes (see, e.g., FIG. 5). One manifestation of this additional data could be ACL rules/filters, directing the endpoint on which traffic is allowed to access the network and which traffic should be blocked. The format of these ACL rules can be flexible dependent on a given instantiation of the model. In one instantiation, the ACL format could be simple 5-tuple rules (Src/Dst IP, Src/Dst Ports, Protocol).

In response to delegation command 206, endpoint enforcement engine 214 changes mode and becomes a policy enforcement point. If a secure control channel was created during the assessment process, then endpoint enforcement engine 214 may continue to use the secure control channel. Alternatively, if a secure control channel was not constructed then endpoint enforcement engine 214 may communicate with PDP 230 via a data channel.

After endpoint enforcement engine 214 has been switched to PEP mode 216, host 212 may request access to the network via endpoint enforcement engine 214. Endpoint enforcement engine 214 (acting as a PEP) may assess the integrity and/or capabilities of host 212 and report the results to PDP 230. If endpoint enforcement engine 214 is operating in PDP mode 217, then it can determine whether or not to grant network access to host 212.

Figure 3:
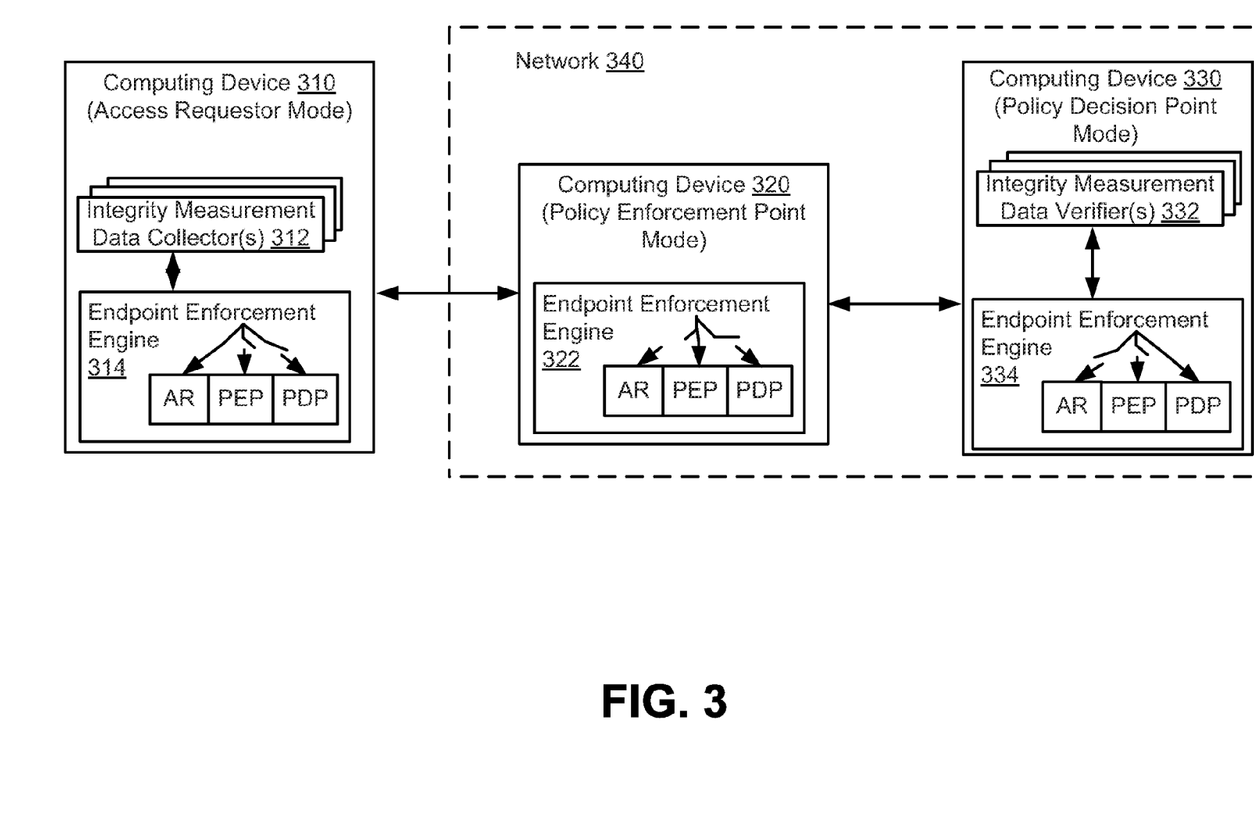
FIG. 3 is a block diagram illustrating selected aspects of an embodiment in which integrity measurement data is collected and verified to establish the integrity and/or capabilities of an access requestor.

FIG. 3 is a block diagram illustrating selected aspects of an embodiment in which integrity measurement data is collected and verified to establish the integrity and/or capabilities of an access requestor. Computing devices 310, 320, and 330 respectively include endpoint enforcement engines 314, 322, and 334. Each of the endpoint enforcement engines (314, 322, and 334) are set to a different network access control mode. More specifically, computing devices 310, 320, and 330 are respectively operating in the AR, PEP, and PDP modes. It is to be appreciated that in an alternative embodiment, different modes/roles may be used to control access to a network.

Computing device 310 includes integrity measurement data collector(s) 312. In one embodiment, integrity measurement data collector(s) 312 are software components that measure various aspects of the integrity and/or capabilities of computing system 310. The measured characteristics may include, for example, anti-virus parameters, firewall status, software versions, hardware component status, firmware version/status, and the like. In an alternative embodiment, integrity measurement collector(s) 312 can be implemented with a combination of hardware, software, and/or firmware components. In an embodiment, each endpoint enforcement engine (e.g., 314, 322, and 334) may be capable of requesting, verifying and/or collecting integrity measurement data.

Integrity measurement data collector(s) 312 collect data from various hardware, software, and/or firmware components of computing device 310. Computing device 310 (operating in AR mode) may provide (at least a portion of) that data when it attempts to connect to network 340. Computing device 310 may provide the data to computing device 320 (acting in PEP mode) or directly to computing device 330 (acting in PDP mode).

Computing device 330 includes integrity measurement data verifier(s) 332. In one embodiment, integrity measurement data verifier(s) 332 are components that verify the integrity and capabilities of a computing system operating as an AR (e.g., computing system 310). The verification is performed based, at least in part, on the integrity measurement data received from the computing system. In an embodiment, computing device 330 determines whether to extend (or retract) network access control rights to computing device 310 based, at least in part, on the results provided by integrity measurement data verifier(s) 332. For example, if computing device 330 determines that computing device 310 has the requisite integrity and capabilities to be a PEP, then it can dynamically instruct endpoint enforcement engine 314 to switch to the PEP mode (and/or the PDP mode).

Figure 4:
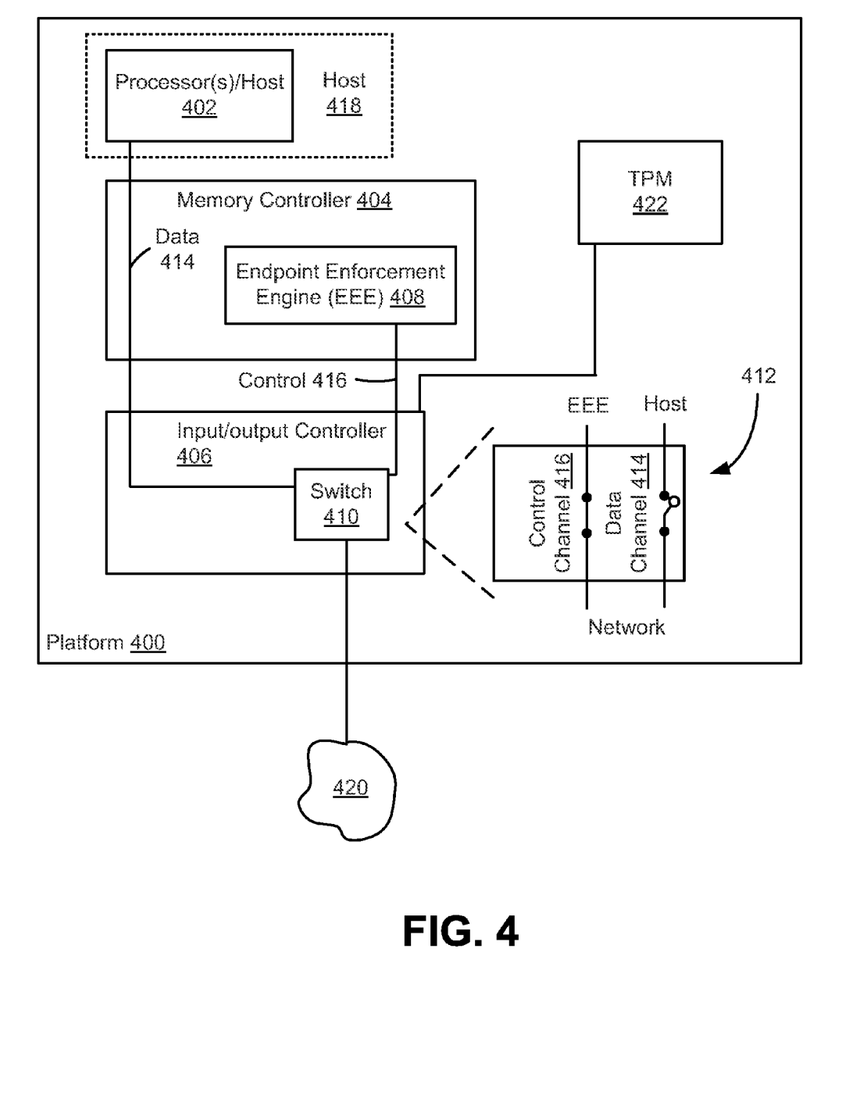
FIG. 4 is a block diagram of selected aspects of a platform, implemented according to an embodiment of the invention.

FIG. 4 is a block diagram of selected aspects of platform 400, implemented according to an embodiment of the invention. Platform 400 includes processor(s) 402, memory controller 404, and Input/Output (I/O) controller 406. Memory controller 404 controls, at least in part, the flow of data between processor(s) 402 and a memory subsystem (not shown). I/O controller 406 controls the flow of data between platform 400 and one or more I/O interfaces (e.g., wired and wireless network interfaces) and/or I/O devices. In an alternative embodiment, memory controller 404 and I/O controller 406 may be integrated into a single controller. In yet another alternative embodiment, each of memory controller 404 and I/O controller 406 are distributed across multiple components of platform 400.

In the illustrated embodiment, endpoint enforcement engine 408 is a component of memory controller 404. In an alternative embodiment, endpoint enforcement engine 408 may be implemented on a different element of platform 400 or may be distributed across more than one element of platform 400. As described above, endpoint enforcement engine 408 enables platform 400 to be dynamically switched between two or more network access control modes (e.g., an AR mode, a PEP mode, and/or a PDP mode).

In an embodiment, I/O controller 406 includes switch 410 to control a data and/or a control channel to a network port. Switch 410 is shown in further detail in callout 412. In an embodiment, endpoint enforcement engine 408 uses control channel 416 to establish a secure control channel (e.g., a tunnel) with, for example, a PEP and/or a PDP. If the secure control channel is initially established with a PEP, then the PEP may link (e.g., route) the control channel to the PDP. In an embodiment, the PDP uses control channel 416 to dynamically delegate (and/or retract) network access control rights to endpoint enforcement engine 408. That is, the PDP uses control channel 416 to issue a command (or provide another indication) to endpoint enforcement engine 408 to change operating mode (e.g., from AR mode to either PEP mode and/or PDP mode).

In an embodiment, data channel 414 is used to transfer requests and/or responses between host 418 and network 420. In addition, endpoint enforcement engine 408 may use data channel 414 to negotiate a connection to network 420 if, for example, control channel 416 is not available. In an embodiment, data channel 414 and control channel 416 are based, at least in part, on the 802.1x standard. In an alternative embodiment, data channel 414 and control channel 416 may be based on a different communication protocol and/or standard.

In an embodiment, platform 400 includes Trusted Platform Module (TPM) 422. TPM 422 is a platform entity that provides one or more capabilities to enhance the security of platform 400. Examples of the security capabilities that may be provided by TPM 422 include protected execution, sealed storage, protected input, protected graphics, attestation, protected launch, and the like. In one embodiment, a PDP (or PEP or other entity) may use TPM 422 to establish (at least in part) the identity and/or integrity of platform 400.

Figure 5:
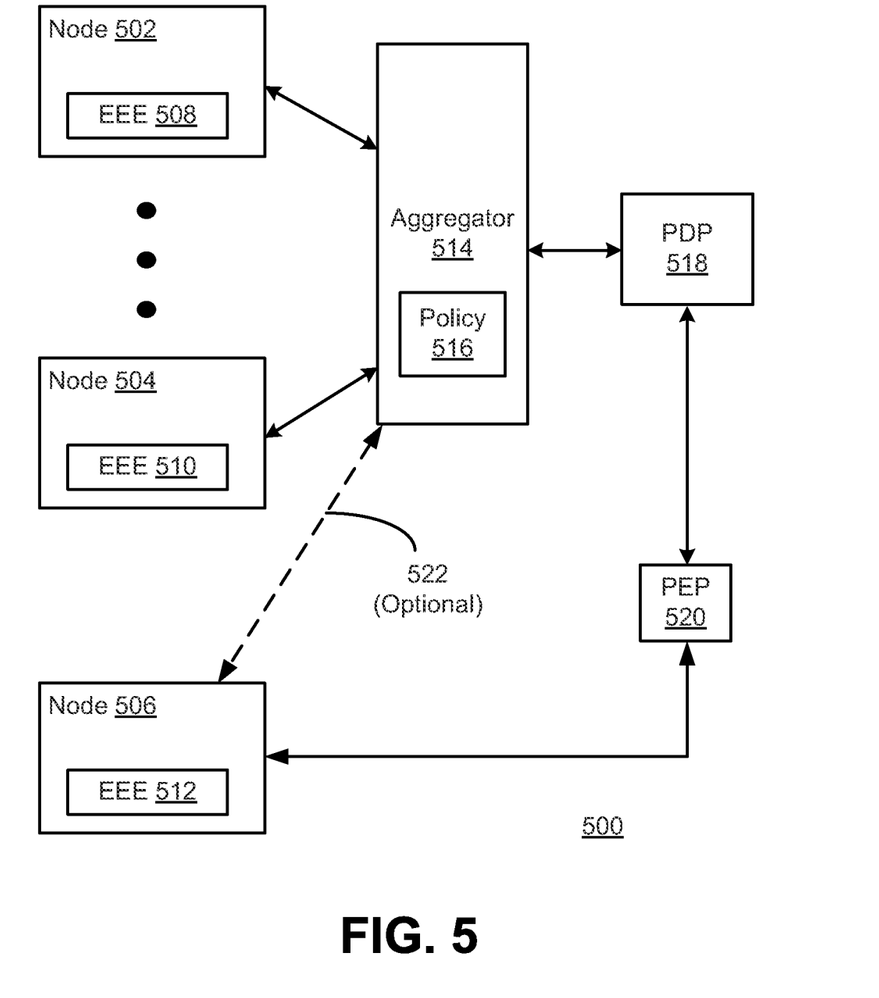
FIG. 5 is a block diagram of a system in which network access control delegation can be based on empirical data collected from a number of network nodes.

As described above with reference to FIG. 3, a PDP may make decisions regarding the delegation of network access control based, at least in part, on empirical data derived from the access requestor (e.g., integrity measurement data). In an embodiment, the PDP may also use data collected from any number of nodes connected to the network (e.g., in addition to data derived from the AR or instead of data derived from the AR). FIG. 5 is a block diagram of system 500 in which network access control delegation can be based on empirical data collected from a number of network nodes.

System 500 includes network nodes (or, simply, nodes) 502-506. The term node broadly refers to a computing device capable of connecting to a network. Network nodes 502, 504, and 506 respectively include endpoint enforcement engines 508, 510, and 512. Each of endpoint enforcement engines 508, 510, and 512 may include integrity measurement data collector(s) (e.g., integrity measurement data collector(s) 312, shown in FIG. 3).

In an embodiment, aggregator 514 receives and processes integrity measurement data from nodes 502-504 (and, optionally, at 522, from node 506). Aggregator 514 may compare the received data to policy 516 and provide the result to PDP 518. In an embodiment, policy 516 is a policy that governs the delegation of network access control (e.g., policy 516).

In an embodiment, PDP 518 receives the output from aggregator 514 and decides whether to extend (and/or retract) network access control rights to, for example, node 506. For example, PDP 518 may extend network access control rights by instructing endpoint enforcement engine 512 to switch from AR mode to PEP mode (and/or to PDP mode). Alternatively, PDP 518 may retract network access rights by instructing endpoint enforcement engine 512 to switch from PEP mode (and/or from PDP mode) to AR mode. PDP 518 may communicate directly with node 506 or it may communicate indirectly with node 506 via, for example, PEP 520.

Figure 6:
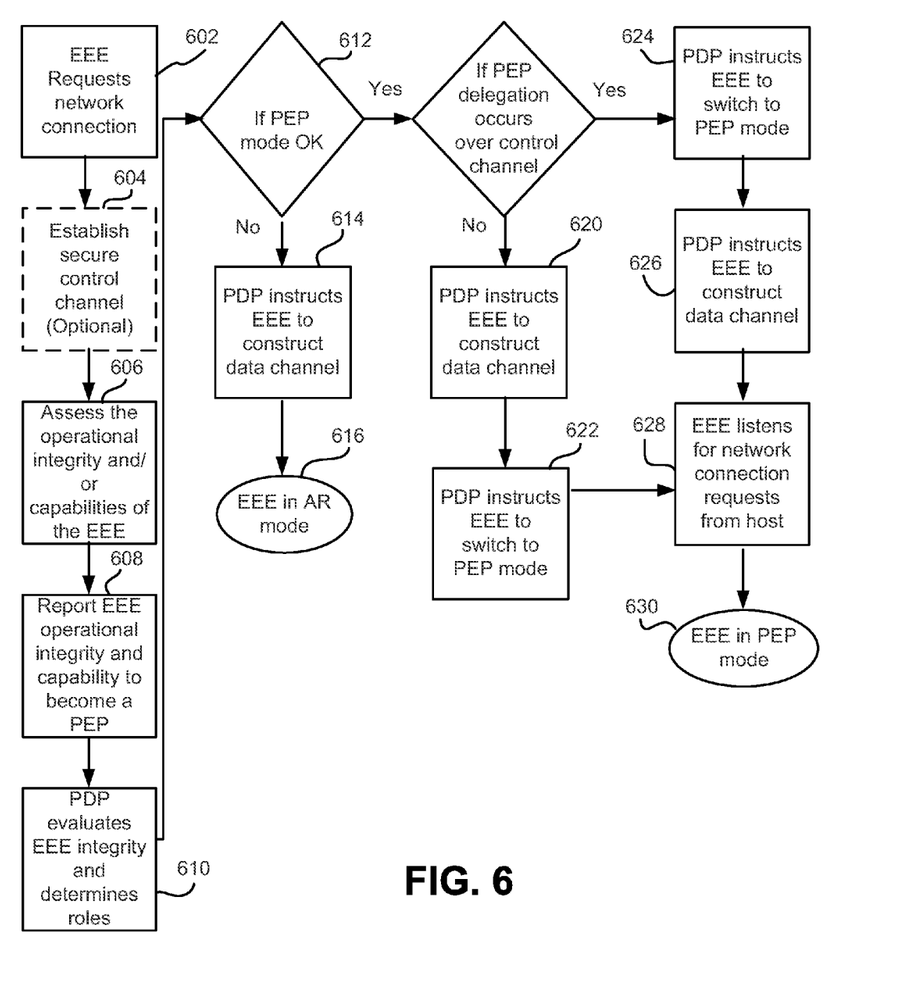
FIG. 6 is a flow diagram illustrating certain aspects of methods for dynamically delegating network access control functionality according to an embodiment of the invention.

Turning now to FIG. 6, the particular methods associated with embodiments of the inventions are described with reference to a flowchart. The methods to be performed by a computing device (e.g., computing device 310, shown in FIG. 3) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the inventions are not described with reference to any particular programming language. It will be appreciated that a variety of programming languages may be used to implement embodiments of the inventions as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 6 is a flow diagram illustrating certain aspects of methods for dynamically delegating network access control functionality according to an embodiment of the invention. The embodiment is described with reference to a network access control model that uses the roles of AR, PEP, and PDP. It is to be appreciated, however, that terms such as AR, PEP, and PDP are used for ease of description. Embodiments of the invention are not limited to a network access control model using these roles. In alternative embodiments dynamically delegating network access control functionality may be performed based on a scheme that uses more roles, fewer roles, and/or different roles.

Referring to process block 602, an endpoint enforcement engine (e.g., endpoint enforcement engine (EEE) 310, shown in FIG. 3) requests a network connection. In one embodiment, the EEE may construct a secure control channel (e.g., control channel 416, shown in FIG. 4) with a PEP during the process of requesting a network connection as shown by 604. The construction of the secure channel may be based, at least in part, on the IEEE 802.1x standard.

Referring to process block 606, the PEP assesses the integrity and/or capabilities of the EEE using, for example, a challenge-response protocol. The assessment process may include, for example, determining the status of security features provided by the platform (e.g., platform 400, shown in FIG. 4) associated with the EEE. In an embodiment, this assessment is based, at least in part, on integrity measurement data provided by the EEE. In one embodiment, the PEP reports, at 608, on the operational integrity and capability of the EEE to, for example, a PDP. In an alternative embodiment, the EEE reports, at least partly reports, its operational integrity and/or capabilities directly to the PDP.

Referring to process block 610, the PDP evaluates the integrity and/or capabilities of the EEE. In an embodiment, the evaluation includes determining a network access control mode for the EEE. For example, the PDP may instruct the EEE to switch to PEP mode if it determines that the EEE is trustworthy (e.g., has the requisite security features). Alternatively (assuming the EEE is already in the PEP mode), the PDP may instruct the EEE to switch to AR mode if, for example, it determines that the EEE's security features are inadequate.

The PDP decides whether to switch the EEE to PEP mode at 612. If the EEE is not switched to PEP mode, then the PDP instructs the EEE to construct a data channel (e.g., data channel 414, shown in FIG. 4) at 614. The EEE continues to operate in AR mode as shown by 616.

As discussed above with reference to process block 604, the assessment of an EEE may occur over a secure control channel. If the assessment did not occur over a secure control channel, then the PDP may instruct the EEE to construct a data channel to the PDP as shown by 620. After the data channel is constructed, the PDP instructs the EEE to switch to PEP mode at 622.

If the assessment process occurs over a secure control channel, the PDP may instruct the EEE to switch to PEP mode using the secure control channel as shown by 624. Referring to process block 626, the PDP instructs the EEE to construct a data channel with the PDP. In an embodiment, the EEE listens for network connection requests from a host as shown by 628. The EEE is in PEP mode as shown by 630.

Elements of embodiments of the present inventions may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the inventions may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present inventions. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the inventions.

Similarly, it should be appreciated that in the foregoing description of embodiments of the inventions, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of these inventions.

What is claimed is:

1. An apparatus comprising:
 a processor including endpoint enforcement engine circuitry to dynamically switch among a plurality of network access control modes responsive, at least in part, to an instruction received from a network connection to a network, wherein the plurality of network access control modes includes:
  an access requester mode for operation of the endpoint enforcement engine circuitry to connect the apparatus to the network; and a policy enforcement point mode for operation of the endpoint enforcement engine circuitry to enforce an access policy on a network node coupled to the network.

2. The apparatus of claim 1, wherein the endpoint enforcement engine circuitry to dynamically switch among the plurality of network access control modes to expand or retract a boundary of the network.

3. The apparatus of claim 1, wherein the plurality of network access control modes further includes a policy decision point mode.

4. The apparatus of claim 1, wherein the instruction further comprises at least one of:
one or more access control list rules to, at least in part, define a network access control mode;
an outbreak containment rule; and
an intrusion detection monitoring rule.

5. The apparatus of claim 1, the policy enforcement point mode for the endpoint enforcement engine circuitry to determine whether to grant a host process of the processor access to the network, including the endpoint enforcement engine circuitry to assess an integrity or a capability of the host process.

6. The apparatus of claim 1, wherein the instruction is received by the apparatus via a channel according to the IEEE 802.1x standard.

7. A system comprising:
a switch to control a network connection to a network; and
a processor to couple to the switch, the processor including endpoint enforcement engine circuitry to dynamically switch among a plurality of network access control modes responsive, at least in part, to an instruction received from the network connection, wherein the plurality of network access control modes includes:
an access requester mode for operation of the endpoint enforcement engine circuitry to connect the apparatus to the network; and
a policy enforcement point mode for operation of the endpoint enforcement engine circuitry to enforce an access policy on a network node coupled to the network.

8. The system of claim 7, wherein the endpoint enforcement engine circuitry to dynamically switch among the plurality of network access control modes to expand or retract a boundary of the network.

9. The system of claim 7, wherein the plurality of network access control modes further includes a policy decision point mode.

10. The system of claim 7, wherein the instruction further comprises at least one of:
one or more access control list rules to, at least in part, define a network access control mode;
an outbreak containment rule; and
an intrusion detection monitoring rule.

11. The system of claim 7, the policy enforcement point mode for the endpoint enforcement engine circuitry to determine whether to grant a host process of the processor access to the network, including the endpoint enforcement engine circuitry to assess an integrity or a capability of the host process.

12. The system of claim 7, wherein the instruction is received by the apparatus via a channel according to the IEEE 802.1x standard.

13. A method at a first network node, the method comprising:
receiving, at endpoint enforcement engine circuitry of a processor, an indication to change a network access control mode of the endpoint enforcement engine circuitry, wherein the indication is based, at least in part, on integrity measurement data derived from one or more network nodes; and
dynamically switching the endpoint enforcement engine circuitry among a plurality of network access control modes responsive, at least in part, to the indication, wherein the plurality of network access control modes includes:
an access requester mode for operation of the endpoint enforcement engine circuitry to connect the first network node to the network; and
a policy enforcement point mode for operation of the endpoint enforcement engine circuitry to enforce an access policy on a network node coupled to the network.

14. The method of claim 13, wherein the endpoint enforcement engine circuitry to dynamically switch among the plurality of network access control modes to expand or retract a boundary of the network.

15. The method of claim 13, wherein the plurality of network access control modes further includes a policy decision point mode.

16. The method of claim 13, wherein the indication further comprises at least one of:
one or more access control list rules to, at least in part, define a network access control mode;
an outbreak containment rule; and
an intrusion detection monitoring rule.

17. The method of claim 13, the policy enforcement point mode for the endpoint enforcement engine circuitry to determine whether to grant a host process of the processor access to the network, including the endpoint enforcement engine circuitry to assess an integrity or a capability of the host process.

18. The method of claim 13, wherein the indication is received by the apparatus via a channel according to the IEEE 802.1x standard.

* * * * *